Jan. 5, 1954 H. MILLER Re. 23,764

WASHING MACHINE OF THE CYLINDRICAL CONTAINER, END DISCHARGE TYPE

Original Filed Oct. 10, 1946

INVENTOR
HERMAN MILLER
BY Raymond H. Thomas
ATTORNEY

Reissued Jan. 5, 1954 Re. 23,764

UNITED STATES PATENT OFFICE 23,764

WASHING MACHINE OF THE CYLINDRICAL CONTAINER, END DISCHARGE TYPE

Herman Miller, Detroit, Mich., assignor to Miller Laundry Machinery Co., Detroit, Mich., a corporation of Michigan Original No. 2,575,673, dated November 20, 1951, Serial No. 702,537, October 10, 1946. Application for reissue July 1, 1953, Serial No. 365,570

5 Claims. (Cl. 68—210)

Matter enclosed in heavy brackets [ ] appears in the original patent but forms no part of this reissue specification; matter printed in italics indicates the additions made by reissue.

This invention relates to washing machines and, in particular, it relates to washing machines of the commercial type, in which a perforated container is rotated within an outer cylinder. More particularly, the invention relates to a commercial washing machine in which laundry may be fed into a horizontally disposed cylindrical container through one end thereof, and including means for elevating one end of the washing machine for the purpose of ejecting laundry from the machine.

In washing machines of the commercial type, it is conventional practice to provide an inner cylinder rotatably mounted within an outer cylinder, and to provide doors through the cylindrical surface of the cylinder for the purpose of loading and unloading the machine with laundry. The loading of the machine with laundry is not very difficult, but the unloading operation involves considerable manual labor. This is because the laundry is wet and it is necessary to manually grasp and lift several hundred pounds of wet laundry from the machine after each cycle of its operation.

In accordance with the practice of my invention, I provide a commercial washing machine having a rotatable inner cylinder and a stationary outer cylinder. One of the ends of both cylinders are open and these openings are closeable by a hinged double door, one portion of the door being rotatable with the inner cylinder while the outer portion of the door is stationary and is adapted to close in sealing engagement with the outer cylinder. The drive and the principal support for the inner cylinder is located at one end only of the machine and opposite to the door end. The support for the washing machine includes a hinge at one end, and means at the opposite end for elevating one end of the washing machine.

A washing machine of this description provides a number of novel features. For example, the end doors of the machine may be swung open and dry laundry may be easily loaded into the open end of the cylindrical container. Thereafter, the door is closed and water, together with a suitable detergent, is fed into the container. After the proper washing and rinsing cycle is completed the end doors are opened and one end of the washing machine is elevated. The inner cylindrical container is rotated while the machine is in its tipped position. This permits the wet laundry to drop out of the end of the inner container into a receptacle positioned to receive the laundry. If desired, before the end doors are opened, the inner container may be rotated rapidly so as to express the water from the laundry due to centrifugal force, thus causing the laundry to be semi-dried before it is ejected from the machine.

It is therefore among the advantages of my invention to provide a washing machine which is self dumping; to provide a washing machine which permits a reduction in manual labor; to provide a washing machine which eliminates the use of conventional doors on the cylindrical surfaces of the cylinder, thereby eliminating the need of registry of the doors and eliminating the additional expense involved in the manufacture of such doors; to provide a washing machine which may be positioned so that the washed laundry may be dropped directly from the washing machine to a receptacle; and, to provide a washing machine of the character described, which may be manufactured economically and which will function efficiently throughout its cycle of operation.

These and other objects and advantages will appear more fully in the following detailed description when considered in connection with the accompanying drawing, in which.

Figure 1:
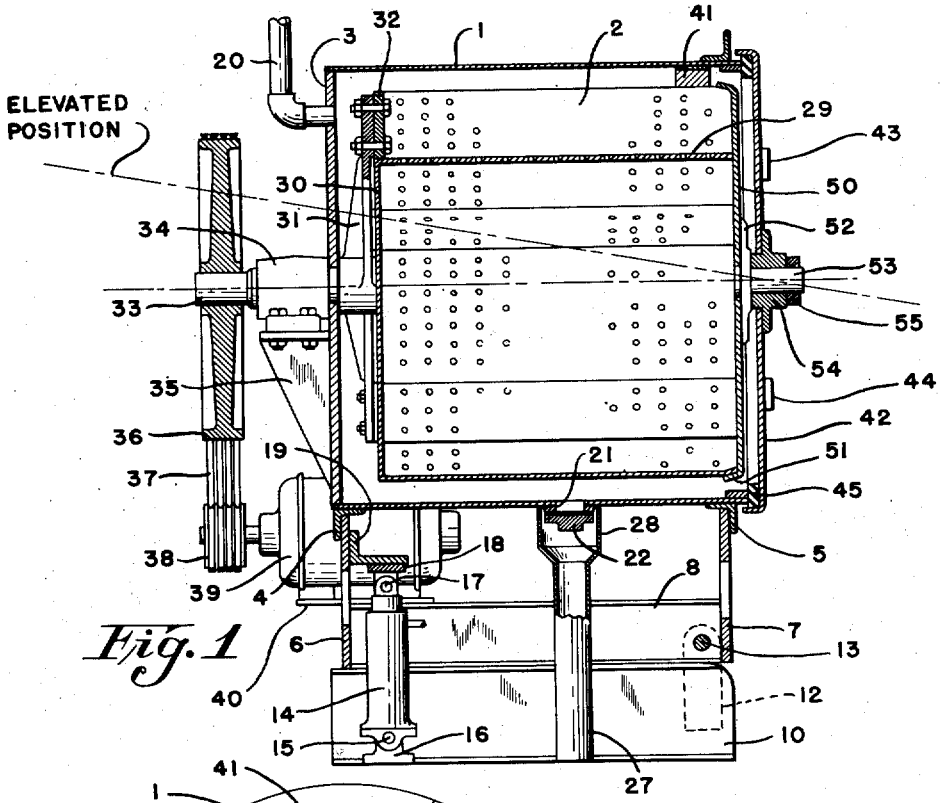
Figure 1 is an elevational view in longitudinal section of a washing machine embodying the features of my invention.

With reference to the drawing and, in particular, to Figure 1, I show an embodiment of my invention in the form of a commercial washing machine comprising essentially an outer cylindrical container 1 and an inner container 2. The outer container is provided with an end wall 3. Reinforcing structural members 4 and 5 are attached to the container 1 and to frames 6 and 7, respectively, and to a pair of horizontal channels 8 which serve as a base for supporting the outer cylinder 1. A main base to which the machine is pivotally supported comprises a pair of channels 9 and 10. These channels rest upon and are preferably attached to a floor, or similar support. Near one end of each of the channels 9 and 10 is attached brackets 11 and 12, respectively, which serve as a hinge or pivot upon which the washing machine may be tipped. A hinge pin 13 extends through the brackets 11 and 12 and through the pair of channels 8 to constitute the hinge.

At the opposite end of the washing machine is a jack 14 operated, preferably, by hydraulic means. The jack 14 is pivotally attached at 15 to a bracket 16 fastened to the floor upon which the machine rests. The upper end of the jack 14 is pivoted at 17 to a bracket 18 which, in turn, connects with a support 19 fastened to the frame 6. By this arrangement, the jack 14, when it is energized, elevates one end of the washing machine while the opposite end pivots to the hinge pin 13. This results in a tipping action of the entire washing machine.

For the purpose of introducing water into the cylinder 1, a conduit 20 extending through the plate 3 is employed. A portion of the conduit 20 may be of flexible construction so as to permit elevation of the washing machine while maintaining the water connection.

Figure 2:
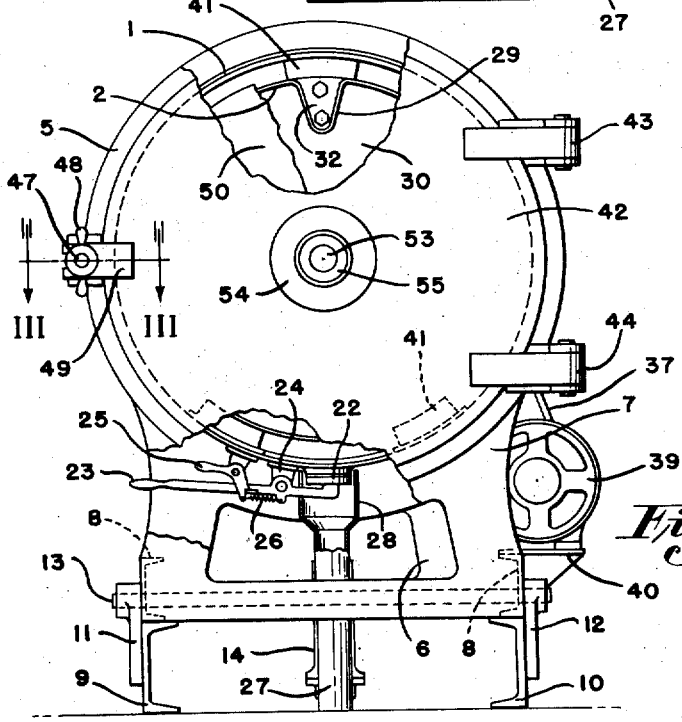
Figure 2 is an end elevational view thereof, partly broken away, and partly in section.

At the lower portion of the container 1 is an outlet aperture 21. As shown in Figure 2, a quick dump valve of conventional type is utilized. Essentially, this valve comprises a sealing member 22 having a handle 23 attached thereto and pivotally mounted on a bracket 24 secured to the container 1. A hand operated latch 25 functions to maintain or release the valve from its engaging position, and a spring 26 normally maintains the latch 25 in locked position. Directly below the dump valve is a drain 27 having an enlarged top portion 28 adapted to enclose the principal portion of the sealing member 22 of the dump valve. The drain portion 28 is disengaged from the cylinder 1 so as to permit tipping movement of the washing machine without accompanying movement of the drain.

Rotatably mounted within the container 1 is the inner cylindrical container 2 formed of perforated sheet metal. The container 2 includes a plurality of ribs 29 such as are conventionally employed in washing machines of the cylindrical type. The container 2 is open at one end and is closed at the opposite end by means of a plate 30. A trunnion or flange 31 engages with the closed end of the container 2 by means of being attached to inserted plates 32 fastened in the well of the V-shaped ribs 29. The flange 31 is supported by a shaft 33 mounted in a bearing 34 held in a fixed position by means of a bracket 35 attached to the end plate 3. A pulley 36 keyed to the shaft 33 is driven through belts 37 from a pulley 38 attached to a motor 39. The motor 39 is supported by a plate 40 secured to the upper surface of the channel 8.

In accordance with this arrangement, the container 2 may be driven from the motor 39 while the washing machine is in either a horizontal or tipped position.

To assist in supporting the free end of the container 2, I provide, near the free end of the container, three or more bearing supports 41 attached to the inner surface of the outer cylinder 1 and adapted to form a sliding contact with the outer surface of the inner cylinder 2. These bearing blocks 41 may be composed of a suitable bearing material such, for example, as lignum vitae. These bearing blocks, when positioned in spaced relation, serve to remove the strain on the principal drive support for the container, and will reduce vibration of the container when the container is being rotated with an open end.

Figure 3:
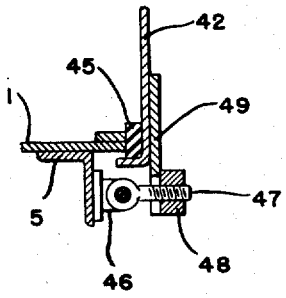
Figure 3 is a detailed view, in section, of a door locking mechanism taken along lines III—III of Figure 2.

In order to form a water-tight enclosure for the outer container 1, I provide a door 42 having hinges 43 and 44 attached to the door and to the reinforcing angle 5 which circumscribes the container 1. A sealing ring 45 lying within the marginal edge of the door 42 engages with the edge of the outer cylinder 1 to constitute a seal and thus form a water tight container. As shown in Figure 3, a bracket 46 is attached to the angle 5, and an eye screw 47 is pivoted to the bracket 46. By means of a hand operated nut 48 and an extension plate 49 projecting from the door 42, a lock arrangement is provided for securing the door in closed position.

An end enclosure is also provided for the inner container 2. This end enclosure comprises a plate 50 having inwardly tapered edges 51 adapted to engage correspondingly tapered surfaces at the end of the inner container 2. The plate 50 is supported by a flange 52 forming a part of a shaft 53. The shaft 53, in turn, is rotatably supported by a bearing block 54 attached to the door 42. A collar 55 maintains the shaft 53 in proper axial position. This means of enclosing the end of the inner container 2 provides, in addition to the enclosure, a support for the end of the inner container 2. By supporting the inner container in this manner, it is possible to rotate the inner container 2 at relatively high speeds for the purpose of semi-drying laundry by means of expressing the water therefrom by centrifugal force.

In the operation of the washing machine constituting an embodiment of my invention, the door 42 is opened and the dry laundry is positioned within the container 2. Thereafter the door is closed and a desired quantity of water is introduced through the conduit 20. A suitable detergent may be placed initially in the container or it may be introduced through an additional conduit (not shown). The motor 39 is started and the inner container is rotated for the washing cycle. If desired, the motor may be of a reversible type so as to result in a given number of turns of the container 2 in one direction, and a similar number of turns in the opposite direction. When the washing cycle is completed, the dump valve is actuated allowing the water to run out of the container 1. Thereafter, clear water is introduced into the container followed by a rinsing cycle. The dump valve is again actuated and the water is permitted to run down the drain. Throughout these operations, the container may be rotated continuously. If desired, the motor 39 may be increased in speed so as to dry the laundry, partially, due to centrifugal action. The door 42 is next opened and the jack 14 is actuated to elevate one end of the washing machine. A receptacle may be positioned at the outlet end of the washing machine to receive the laundry which is ejected from the machine. Rotation of the container 2, while the washing machine is in its tipped position, results in the wet laundry being moved easily and quickly from the container 2. When all of the laundry is removed from the container the jack 14 is lowered and the machine is ready for a similar cycle of operation.

As thus shown and described, it is believed apparent that I have provided a novel washing machine which constitutes a unique method of unloading laundry with its resulting reduction in manual labor and with an increase in efficiency and reduction in the time cycle of operation.

While I have shown a preferred embodiment of my invention it is to be understood that it is susceptible of those modifications which appear obviously within the spirit of the invention and as appearing in the scope of the appended claims.

Having thus described my invention what I claim and desire to protect by Letters Patent is:

1. A washing machine comprising a horizontally disposed cylindrical tank having an open end, a perforated container rotatable within the cylindrical tank and having an open end the diameter of which is substantially equal to the diameter of the perforated container, means for rotating the perforated container, a support upon which the cylindrical tank rests, a hinge for joining the open end portion of the cylindrical tank to the support, means for elevating *and lowering* the cylindrical tank at the end opposite to its open end, a door adaptable for closing the open end of the cylindrical tank and the rotatable container, said door comprising separate walls for engagement with the cylindrical tank and the rotatable container, one of the walls of said door being positionable in stationary relationship with the cylindrical tank and the other wall being rotatable with the perforated container, and sealing means positioned between the outer marginal portion of said door and the edges of the open end of said cylindrical tank, whereby when the cylinder is rotated, the doors open, and the closed end of the cylindrical tank elevated, the laundry within the perforated container progressively and unrestrictedly moves out of the perforated container and is discharged from the washing machine.

[2. A washing machine comprising a horizontally disposed cylindrical tank having an open end, a perforated container rotatable within the cylindrical tank and having an open end the diameter of which is substantially equal to the diameter of the perforated container, means for rotating the perforated container, a drain valve attached to the underside of the cylindrical tank, a drain in registry with the drain valve and disconnected with the cylindrical tank, a support, means for pivotally connecting the door end of the cylindrical tank to the support, and means for elevating one end of the cylindrical tank, said elevating means comprising a fluid operable cylinder having one end attached to the end of the cylindrical tank which is opposite to said door, and the other end of the fluid operable cylinder being attached to said support, whereby when the cylinder is rotated, the doors open, and the closed end of the cylindrical tank elevated, the laundry within the perforated container progressively and unrestrictedly moves out of the perforated container and is discharged from the washing machine.]

3. A washing machine comprising a horizontally disposed cylindrical tank having an open end, a perforated container rotatable within the cylindrical tank and having an open end the diameter of which is substantially equal to the diameter of the perforated container, means for rotating the perforated container, a drain valve attached to the underside of the cylindrical tank, a drain in registry with the drain valve and disconnected with the cylindrical tank, a door hinged to said tank having portions thereof for engagement with the open end edges of said tank and said container when the door is in its closed position and for disengagement therewith when the door is in its open position, said door comprising separate walls for engaging with the cylindrical tank and the rotatable container, a support, means for pivotally connecting the door end of the cylindrical tank to the support, and means for elevating *and lowering* one end of the cylindrical tank, said [elevating] *last mentioned* means comprising a fluid operable *device including first and second relatively movable parts* [cylinder] having one [end] *part* attached to the end of the cylindrical tank which is opposite to said door, and the other [end] *part* of the fluid operable [cylinder] *device* being attached to said support, whereby when the *device is actuated* [cylinder is rotated], the doors *opened* [open], and the closed end of the cylindrical tank elevated, the laundry within the perforated container progressively and unrestrictedly moves out of the perforated container and is discharged from the washing machine.

4. A washing machine comprising a horizontally disposed cylindrical tank having an open end, a perforated container rotatable within the cylindrical tank and having an open end the diameter of which is substantially equal to the diameter of the perforated container, means for rotating the perforated container, a drain valve attached to the underside of the cylindrical tank, a drain in registry with the drain valve and disconnected with the cylindrical tank, a door hinged to said tank having portions thereof for engagement with the open end edges of said tank and said container when the door is in its closed position and for disengagement therewith when the door is in its open position, said door comprising *separate* [separating] walls [for] engaging [with] the cylindrical tank and the rotatable container *respectively*, one of the walls of said door being positionable in stationary relationship with the cylindrical tank and the other wall being rotatable with the perforated container, a support, means for pivotally connecting the door end of the cylindrical tank to the support, and means for elevating *and lowering* one end of the cylindrical tank, said *last mentioned* [elevating] means comprising a fluid operable *device including first and second movable parts* [cylinder] having one *part* [end] attached to the end of the cylindrical tank which is opposite to said door, and the other [end] *part* of the fluid operable *device* [cylinder] being attached to said support, whereby when the *device is actuated* [cylinder is rotated], the doors *opened* [open], and the closed end of the cylindrical tank elevated, the laundry within the perforated container progressively and unrestrictedly moves out of the perforated container and is discharged from the washing machine.

*5. Laundry handling equipment comprising a horizontally disposed cylindrical tank having an open end, a perforated container rotatable within the cylindrical tank and having an open end the diameter of which is substantially equal to the diameter of the perforated container, means for rotating the perforated container, a support upon which the cylindrical tank rests, a hinge for joining the open end portion of the cylindrical tank to the support, means for elevating and lowering the cylindrical tank at the end opposite to its open end, and a door adaptable for closing the open end of the cylindrical tank and the rotatable container, said door comprising separate walls for engagement with the cylindrical tank and the rotatable container, one of the walls of said door being positionable in stationary relationship with the cylindrical tank and the other wall being rotatable with the perforated container, whereby when the cylinder is rotated, the doors open, and the closed end of the cylindrical tank elevated, the laundry within the perforated container progressively and unrestrictedly moves out of the perforated container and is discharged from said equipment.*

*6. A washing machine comprising a horizontally disposed cylindrical tank having an open end,*

*a perforated container rotatable within the cylindrical tank and having an open end the diameter of which is substantially equal to the diameter of the perforated container, means for rotating the perforated container, a drain valve attached to the underside of the cylindrical tank, a drain in registry with the drain valve and disconnected with the cylindrical tank, a door hinged to said tank having portions thereof for engagement with the open end edges of said tank and said container when the door is in its closed position and for disengagement therewith when the door is in its open position, a support, means for pivotally connecting the door end of the cylindrical tank to the support, and means for elevating and lowering one end of the cylindrical tank, said last mentioned means comprising a fluid operable device having first and second relatively movable parts, wherein one part is attached to the end of the cylindrical tank which is opposite to said door, and the other part of the fluid operable device being attached to said support, whereby when the device is actuated, the doors opened, and the*

*closed end of the cylindrical tank elevated, the laundry within the perforated container progressively and unrestrictedly moves out of the perforated container and is discharged from the washing machine.*

HERMAN MILLER.

References Cited in the file of this patent or the original patent

UNITED STATES PATENTS

| Number | Name | Date |
|---|---|---|
| 1,400,977 | Perry | Dec. 20, 1921 |
| 1,928,950 | O'Neill | Oct. 3, 1933 |
| 2,066,998 | Nash | Jan. 5, 1937 |
| 2,074,508 | Hetzer | Mar. 23, 1937 |
| 2,105,248 | Johnson | Jan. 11, 1938 |
| 2,118,227 | Ranschoff | May 24, 1938 |
| 2,370,792 | Hoffman | Mar. 6, 1945 |
| 2,391,634 | Lewis | Dec. 25, 1945 |
| 2,428,489 | Goodreau | Oct. 7, 1947 |
| 2,436,883 | Ellis | Mar. 2, 1948 |